United States Patent [19]

Takahashi

[11] Patent Number: 4,784,630
[45] Date of Patent: Nov. 15, 1988

[54] ROTATING SPEED DETECTING DEVICE FOR A CONTINUOUSLY VARIABLE TRANSMISSION FOR A VEHICLE

[75] Inventor: Masahiko Takahashi, Tokyo, Japan

[73] Assignee: Fuji Jukogyo Kabushiki Kaisha, Tokyo, Japan

[21] Appl. No.: 130,882

[22] Filed: Dec. 10, 1987

[30] Foreign Application Priority Data

Dec. 17, 1986 [JP] Japan ............................. 61-300634
Dec. 17, 1986 [JP] Japan ............................. 61-300635

[51] Int. Cl.$^4$ ............................................. F16H 11/06
[52] U.S. Cl. ........................................... 474/28; 74/856
[58] Field of Search .................. 474/18, 28, 69, 70, 474/11, 12; 74/856, 861–864, 867, 870, 871

[56] References Cited

U.S. PATENT DOCUMENTS 4,583,423  4/1986  Hahne .......................... 474/28 X

FOREIGN PATENT DOCUMENTS 60-104852  6/1985  Japan .

Primary Examiner—Thuy M. Bui
Attorney, Agent, or Firm—Martin A. Farber

[57] ABSTRACT

A continuously variable transmission has a drive pulley, an annular groove formed on a side of the drive pulley, and a pitot tube provided in the annular groove. The pitot tube has an elliptic section, and the major axis of the ellipse is arranged in a tangential direction of an annular flow of oil in the groove. An open end of the pitot tube faces to said flow of oil.

3 Claims, 5 Drawing Sheets

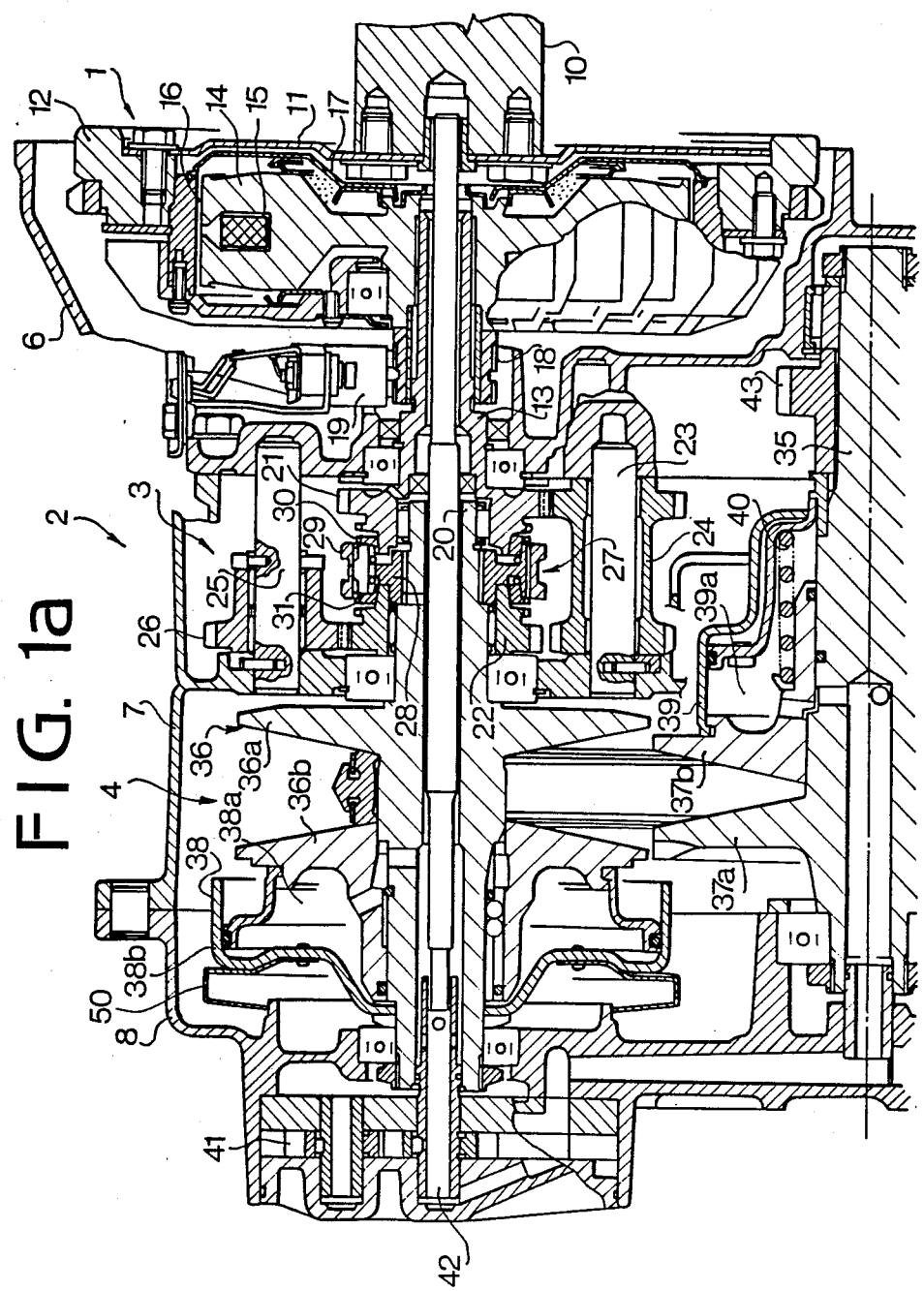

ROTATING SPEED DETECTING DEVICE FOR A CONTINUOUSLY VARIABLE TRANSMISSION FOR A VEHICLE

BACKGROUND OF THE INVENTION

The present invention relates to a rotating speed detecting device for a continuously variable belt-drive transmission for a motor vehicle, and more particularly to a device for measuring a pitot pressure of an oil stream in a drive pulley by means of a pitot tube.

Japanese Patent Application Laid Open No. 60-104852 discloses a speed measuring system in which a pitot tube is provided under oil in an annular groove formed on one side of a drive pulley which is connected an output shaft of an engine. When the drive pulley is rotated, the oil in the groove is rotated with the pulley. The system detects the total pressure (pitot pressure) of the oil stream for controlling the transmission ratio and the line pressure in a CVT. In such a system, it is desirable that an inlet of the pitot tube has a large opening area in order to measure the pitot pressure with accuracy. To this end, the pitot tube is formed to have a cylindrical shape having a round inlet. However, the round end of the pitot tube obstructs the groove to generate the turbulence of the oil. The turbulent flow inducts air in the oil to form bubbles. The air in the oil causes the pitot pressure to fluctuate. Accordingly, it is disadvantageous to increase the opening area of the inlet.

SUMMARY OF THE INVENTION

The object of the present invention is to provide a rotating speed detecting device by which the pitot pressure is accurately and stably measured.

According to the present invention, there is provided a rotating speed detecting device for a continuously variable transmission having a drive pulley, an annular housing secured to a side of the drive pulley and forming an annular groove, a pitot tube provided in the annular groove and an oil supply pipe for supply oil to the groove.

The pitot tube has an elliptic section, and the major axis of the ellipse is arranged in a tangential direction of an annular flow of oil in the groove, and an open end of the pitot tube faces to the flow of oil.

In an aspect of the invention, the open end is formed by obliquely cutting the pitot tube, and the oil supply pipe is disposed in a downstream position with respect to the pitot tube.

The other objects and features of this invention will be apparently understood from the following description with reference to the accompanying drawings.

BRIEF DESCRIPTION OF DRAWINGS

FIGS. 1a and 1b show a continuously variable belt-drive transmission to which the present invention is applied;

DETAILED DESCRIPTION OF THE PREFERRED EMBODIMENT

Figure 1B:
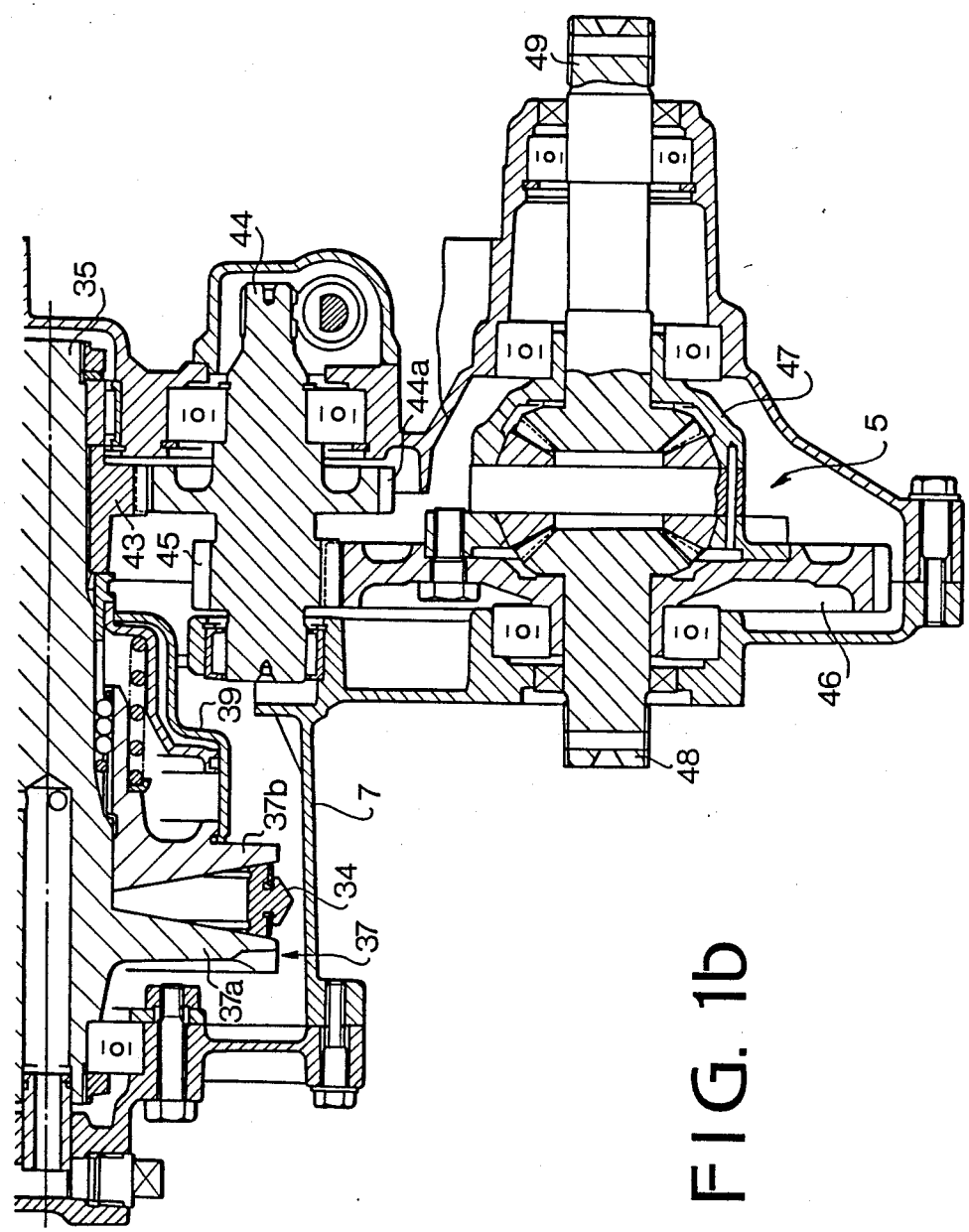

Referring to FIGS. 1a and 1b, a continuously variable belt-device automatic transmission for a vehicle, to which the present invention is applied, comprises an electromagnetic powder clutch 1, a continuously variable belt-drive transmission 2 (called hereinafter CVT). The CVT 2 has a selector device 3, pulley and belt device 4, and final reduction device 5. The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1.

The electromagnetic powder clutch 1 comprises a driven member 14, a magnetizing coil 15 provided in the driven member 14. The driven member 14 has its outer periphery spaced from the inner periphery of the drive member 12 by a gap 16, and a powder chamber 17 is defined between the drive member 12 and driven member 14. Powder of magnetic material is provided in the powder chamber 17. The driven member 14 is secured to an input shaft 13 of the CVT 2. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the CVT 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 as a synchromesh mechanism, which is mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) or a parking position (P range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide driving positions. When the sleeve 29 is engaged with the gear 22, the input shaft 13 is connected to the main shaft 20 through gears 21, 24, 26 and 22 to provide a reverse driving position.

In the pulleys and belt device 4, the main shaft 20 has an axial passage in which an oil pump driving shaft 42 connected to crankshaft 10 is mounted. An output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder 38b secured to the main shaft 20 to form a servo device 38. A chamber 38a of the servo device 38 communicates with an oil pump 41 through a pressure oil control circuit (not shown). The oil pump 41 is driven by the shaft 42.

A pitot pressure detecting device 50 is mounted on the cylinder 38b of the servo device 38 for detecting a rotating speed for the CVT 2 as described hereinafter.

A fixed conical disc 37a of the driven pulley 37 is formed on the output shaft 35 opposite the movable disc 36b and a movable conical disc 37b is slidably mounted on the shaft 35 opposite disc 36a. Movable conical disc 37b has a cylindrical portion in which a piston portion of the output shaft 35 is slidably engaged to form a servo device 39. A chamber 39a of the servo device 39 is communicated with the oil pump 41 through the pressure oil control circuit. A spring 40 is provided to urge the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

Figure 2:
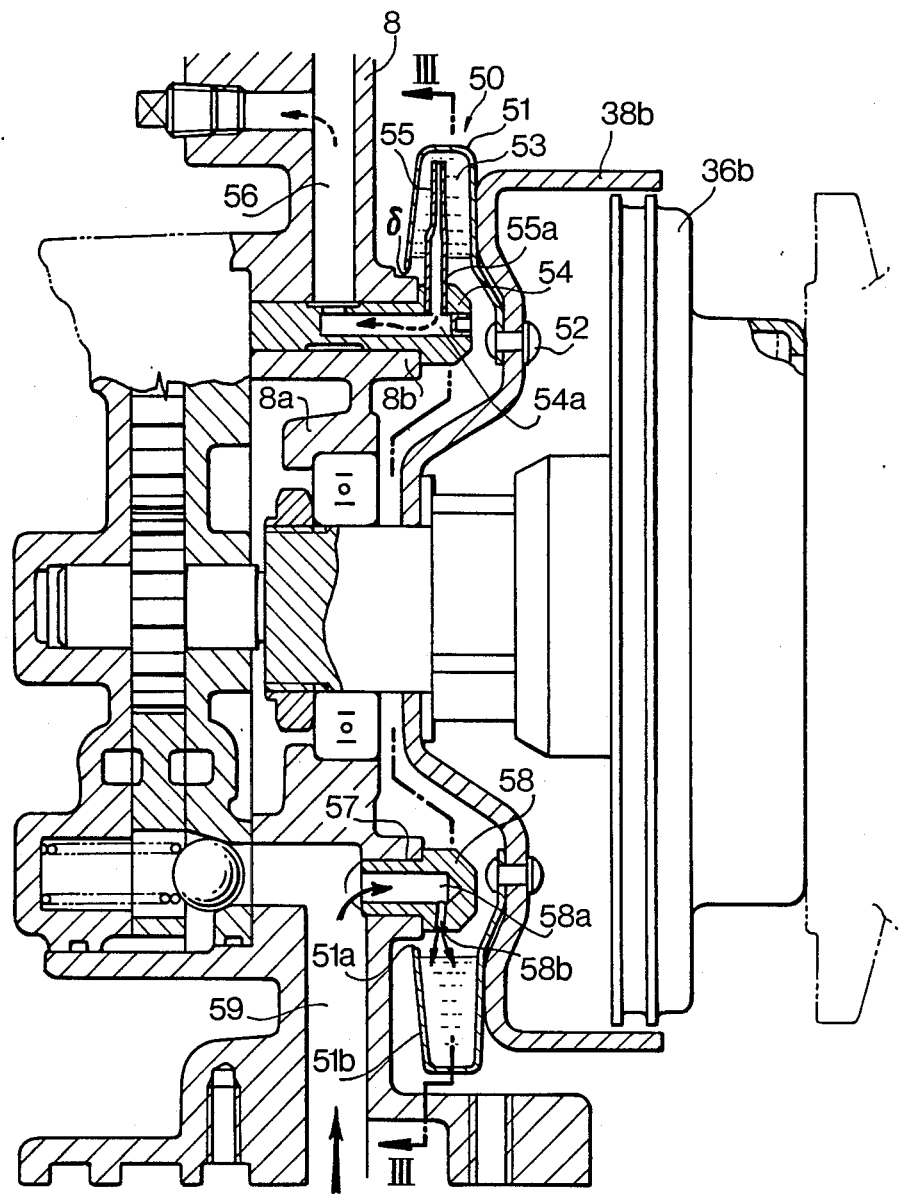
FIG. 2 is an enlarged sectional view of a pitot pressure detecting device of the present invention.
Figure 3:
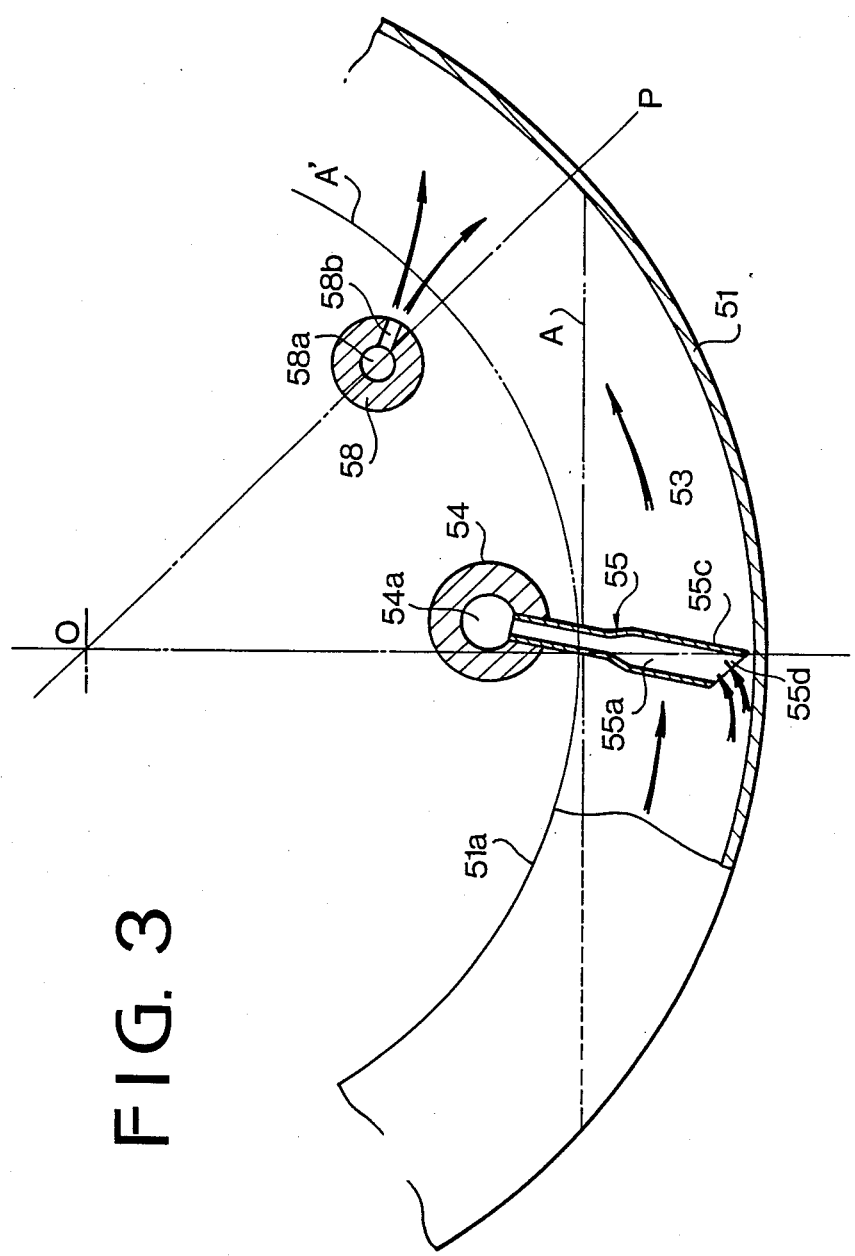
FIG. 3 is a sectional view taken along a line III—III of FIG. 2.

Referring to FIGS. 2 and 3, the pitot pressure detecting device 50 comprises an annular housing 51 secured to the cylinder 38b of the servo device 38 at a base thereof by rivets 52. The annular housing 51 has a U-shaped section for defining an annular groove 53 for holding the oil. The housing 51 is disposed adjacent the side housing 8 in such a position that an annular periphery 51a of the housing 51 is opposed to an annular projecting portion 8b of the side housing 8 with a space δ there-between. The oil charged in the groove 53 is overflowed from the periphery 51a through the space δ so that the oil level is positioned lower than the periphery 51a.

A support pipe 54 for supporting a pitot tube 55 is mounted on the projecting portion 8b. The pitot tube 55 having a detect hole 55a is secured to the support pipe 54 at a projected end portion thereof to be disposed in the groove 53. As shown in FIG. 3, the pitot tube is arranged in the radial direction. The pitot tube 55 communicates with an oil passage 56 of the side housing 8 through a hole 54a of the support pipe 54.

When the engine stops, the oil in the groove 53 is remained in a lower portion thereof. The surface of the oil coincides with the periphery 51a of the housing 51 as indicated by A of FIG. 3.

Figure 4A:
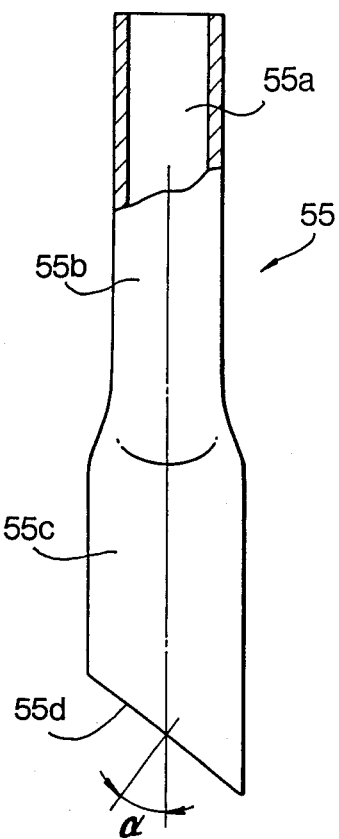
FIG. 4a is a side view of a pitot tube employed in the device.
Figure 4B:
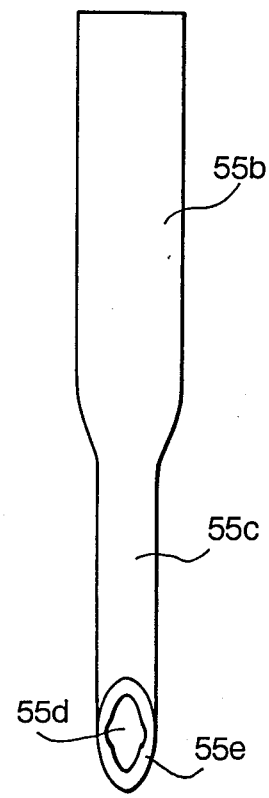
FIG. 4b is a front view of the pitot tube.
Figure 5:
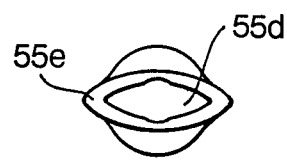
FIG. 5 is an illustration showing a tip end of the pitot tube.

Referring to FIGS. 4a to 5, the pitot tube 55 has an upper cylindrical portion 55b an end of which is secured to the support pipe 54 and a lower elliptic portion 55c which is plunged in the oil in the groove 53. An end of the lower elliptic portion 55c is obliquely cut off to form an elliptic open end 55d having a predetermined angle α with respect to the axis of the pitot tube 55. A cut 55e has a streamline as shown in FIG. 5. The pitot tube 55 is so disposed that the major axis of the elliptic portion 55c extends in the tangential direction of the annular flow of oil and that the open end 55d faces the flow of oil.

The elliptic portion 55c can be formed by inserting a pin having a predetermined diameter into a pipe and pressing the pipe.

An oil supply pipe 58 is inserted into a hole 57 formed in the projecting portion 8b by force fit. The oil supply pipe 58 has an axial hole 58a communicated with a lubricating oil passage 59 formed in the wall 8a of the side housing 8 and a supply port 58b formed in the pipe 58. As shown in FIG. 3, the supply pipe 58 is disposed downstream of the flow of oil with respect to the pitot tube 55. The axis of the supply port 58b is slightly inclined with respect to a radial line O-P passing a rotating center O of the drive pulley 36 and the axis of the oil supply pipe 58 so as to discharge the oil in a downstream direction from the supply pipe. Further, supply port 58b is inclined toward a wall 51b of the housing 51, as shown in FIG. 2.

Describing the operation, when the engine stops, the operation of the oil pump 41 stops and the supply of the oil stops. The oil in the groove 53 remains at the lowest level as indicated by A of FIG. 3. The inlet 55d of the pitot tube 55 is under the oil, so that the oil prevents air from entering into the pitot tube 55. When the engine starts, the oil pump 41 is operated by the oil pump driving shaft 42 which is connected to the crankshaft 10. The oil is fed to the supply pipe 58 through the passage 59 and discharged from the supply port 58b toward the wall 51b and in the flowing direction of the oil. At this time, since the oil in the groove does not flow, the oil pressure is not applied to the pitot tube 55. Thus, a minimum pitot pressure is detected.

When the clutch 1 is engaged, the power of the engine is transmitted to vehicle wheels through the CVT 2. Accordingly, the oil in the groove 53 is rotated together with the wall of the groove 53. The pressure of the flowing oil is applied to the open end 55d so that the pitot pressure relative to the engine speed is detected.

Since the pitot tube has an elliptic section which is arranged in the flowing direction of the oil, turbulence of the flow does not occur. Further, the pitot tube has a large opening area because of the obliquely cut end. Since the supply pipe is disposed in a downstream portion with respect to the pitot tube, the pitot pressure is not affected by the oil supply.

Further, since the oil is discharged into the groove 53 along the wall 51b, the turbulence of oil in the groove 53 is kept minimum, even if a large amount of oil is discharged at high rotating speed.

From the foregoing, it will be understood that the present invention provides a pitot pressure detecting device for detecting a rotating speed which may effectively prevent the turburence of the flowing oil in the groove. Therefore, pitot pressure is stably obtained with accuracy.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A rotating speed detecting device for a continuously variable transmission having a drive pulley, an annular housing secured to a side of the drive pulley and forming an annular groove, a pitot tube provided in said annular groove, and an oil supply pipe for supply oil to said groove, wherein said pitot tube has an elliptic section, a major axis of the ellipse is arranged in a tangential direction of an annular flow of oil in said groove, and an open end of said pitot tube faces to said flow of oil.

2. The rotating speed detecting device according to claim 1 wherein said open end is formed by obliquely cutting said pitot tube.

3. The rotating speed detecting device according to claim 1 wherein said oil supply pipe is disposed in a downstream position with respect to said pitot tube.

* * * * *